Figure 10:
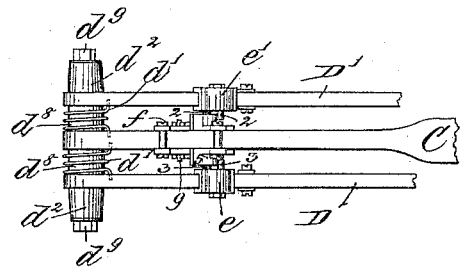

(No Model.) 3 Sheets—Sheet 1.
S. ELLIOTT.
TRICYCLE.
No. 446,670. Patented Feb. 17, 1891.
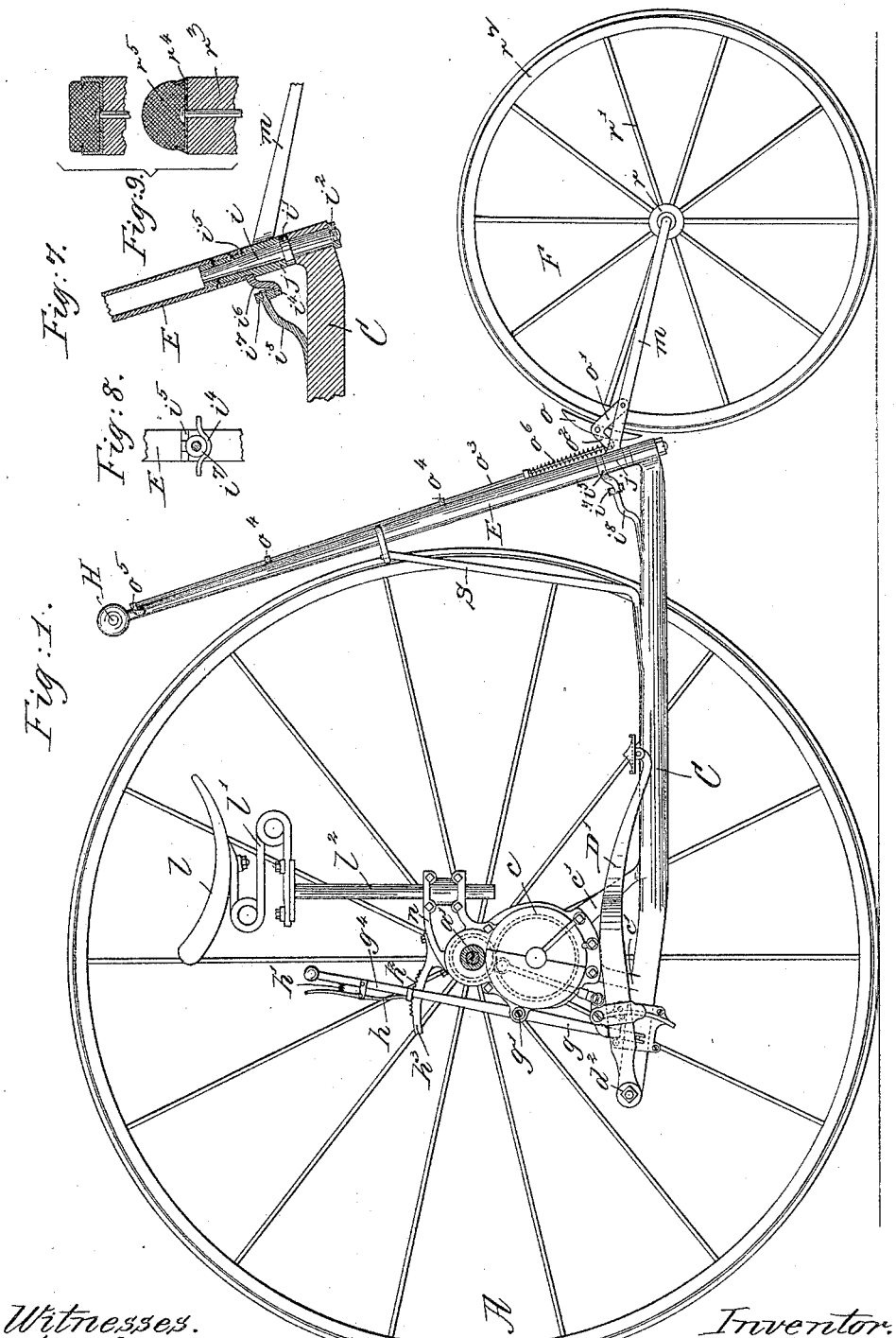
Witnesses.
Arthur Zipperlen.
John F. C. Prindlot.
Inventor.
Sterling Elliott.
by Crosby & Gregory attys

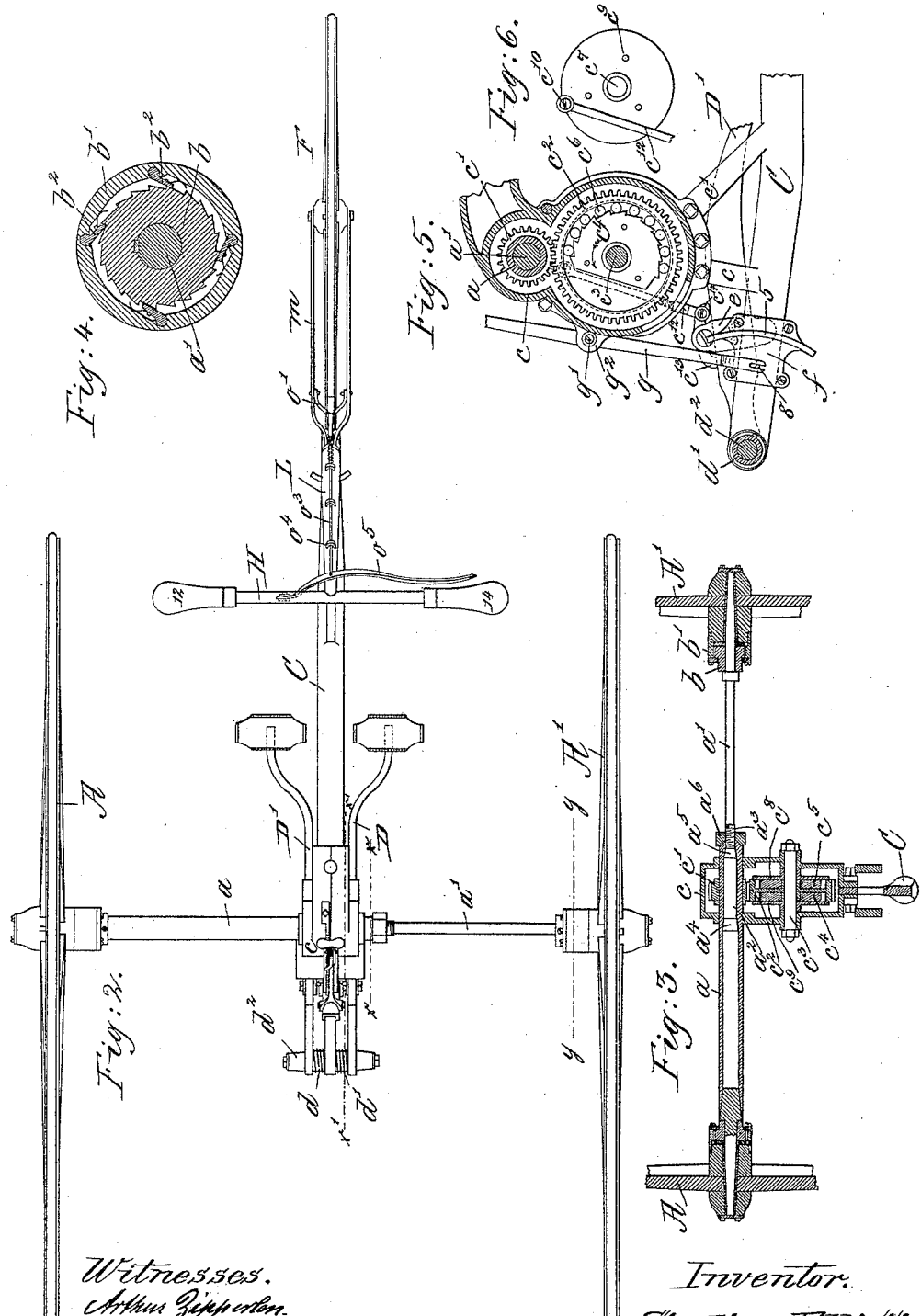

(No Model.)

3 Sheets—Sheet 3.

S. ELLIOTT.
TRICYCLE.

No. 446,670.

Patented Feb. 17, 1891.

Witnesses.
Arthur Zippelen.
John P. C. Poundlock

Inventor.
Sterling Elliott.
By Crosby & Gregory attys.

UNITED STATES PATENT OFFICE.

STERLING ELLIOTT, OF NEWTON, MASSACHUSETTS, ASSIGNOR, BY MESNE ASSIGNMENTS, TO THE STERLING CYCLE COMPANY, OF KITTERY, MAINE.

TRICYCLE.

SPECIFICATION forming part of Letters Patent No. 446,670, dated February 17, 1891.

Application filed May 25, 1886. Serial No. 203,216. (No model.) Patented in England September 15, 1886, No. 11,727, October 18, 1886, No. 13,273, December 17, 1886, No. 16,584, and April 30, 1887, No. 6,304; in France October 22, 1886, No. 179,183; in Belgium October 23, 1886, No. 74,946, and in Germany January 4, 1887, No. 40,387.

*To all whom it may concern:*

Be it known that I, STERLING ELLIOTT, of Newton, county of Middlesex, and State of Massachusetts, have invented an Improvement in Tricycles, (for which Letters Patent have been granted in the following countries, namely: in England, No. 13,273, dated October 18, 1886, No. 16,584, dated December 17, 1886, No. 11,727, dated September 15, 1886, and No. 6,304, dated April 30, 1887; in Belgium, No. 74,946, dated October 23, 1886; in France, No. 179,183, dated October 22, 1886, and in Germany, No. 40,387, dated January 4, 1887), of which the following description, in connection with the accompanying drawings, is a specification, like letters and figures on the drawings representing like parts.

This invention has for its object to construct a light-running and durable velocipede; and, as herein shown, my invention is embodied in a machine of the type commonly termed "tricycle."

In accordance with this invention the main rotating shaft, having attached to it two drive-wheels, is extended through a suitable frame having an attached bar to support the steering-wheel, the steering devices, and a pair of pedal-levers, which latter operate suitable clutch mechanism to drive the main rotating shaft. The clutch mechanism herein shown consists, mainly, of a toothed gear mounted loosely upon a shaft or stud having its bearings in the sides of a frame or case suspended from the main rotating shaft, the said gear being chambered at each side to receive two ratchet-toothed disks connected to crank-wheels and mounted loosely upon the same shaft or stud, each of the said ratchet-toothed disks turning within the recessed portion at one side of the said toothed gear, and suitable anti-friction rollers or balls being interposed between the ratchet-teeth of the said disks and the inside of the flanges of the toothed gear. Each ratchet-toothed disk when reciprocated in one direction will cause the rollers or balls between its periphery and the flanges of the gear to engage the said flange and turn the said toothed gear; but when the disk is moved in the opposite direction it will not rotate the gear, as is well understood. The crank-wheels to which the ratchet-toothed disks are secured have a rotary reciprocating movement imparted to them by suitable wheels, pitmen, or other equivalent connections, such as cords or chains attached operatively to the pedal-levers, so that as the pedal-levers are depressed alternately first one and then the other ratchet-toothed disk is moved forward, while its rolls or balls become the driver and effect the continuous rotation of the said toothed gear, it in turn engaging a pinion fast on and thus rotating the main shaft or axle. The pitmen, connected each at one end with wrist-pins of the crank-wheels, are respectively connected to loosely-sliding blocks mounted upon the pedal-levers, the said sliding blocks being controlled as to their movement or guided by suitable guides located upon opposite sides of a master-block moving upon the frame or bar of the machine, so that as the master-block is moved to and fro the slide-blocks upon the pedal-levers will be moved to increase or diminish the power required to depress the pedal-levers.

Means are provided for manually operating the master-block upon the frame or bar and for locking the same in any desired position.

The steering device consists of a rod pivoted to the main frame and provided with a cross-bar at its upper end, by which the said rod is rotated, and the lower end of the rod rigidly connected with the hub, and so as to move the pivoted yoke carrying the steering-wheel. A suitable brake is also supplied, which consists of a brake-shoe pivoted eccentrically to a pivoted yoke and arranged to come in contact with the periphery of the steering-wheel, the yoke carrying the said brake-shoe being moved by a rod running parallel with the steering-rod and having a hand-lever readily accessible to the rider to retard the machine when desired. The main rotating shaft or axle is in this instance provided with a telescopic joint, so that the drive-wheels may be moved toward each other to thus narrow the machine when desired for any cause—as, for instance, to convey the same through a narrow passage. The drive-wheels are loosely connected with the main rotating shaft, but restrained from backward rotation by a pawl-and-ratchet connection, so that the drive-wheels may rotate forward independently of the main shaft, but be driven forward by the main shaft.

Figure 11:
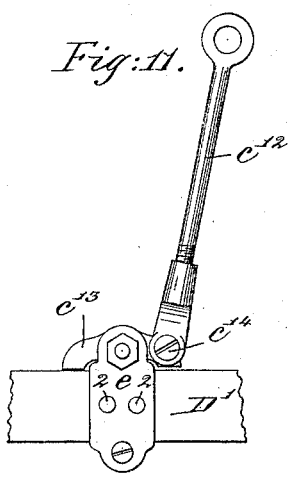

Figure 1 shows in side elevation a tricycle embodying this invention, one of the drive-wheels being removed, the axle being in section on the line $x$ $x$; Fig. 2, a top view of Fig. 1 with the drive-wheel added, the seat being, however, removed. Fig. 3 is a vertical section taken longitudinally of the main rotating shaft and clutch mechanism below it, the figure showing a portion of the drive-wheels; Fig. 4, a section in the line $y$ $y$, Fig. 2, of the pawl-and-ratchet connection controlling the rotation of the drive-wheels; Fig. 5, a section of the clutch mechanism and a portion of the pedal-levers and frame-work, taken on the dotted line $x'$ $x'$, Fig. 2; Fig. 6, a detail showing one of the crank-wheels to be referred to; Figs. 7, 8, and 9, details to be referred to; Fig. 10, an under side view of a portion of the pedal-levers and the frame, showing the master-block and the slide-blocks upon the pedal-levers; and Fig. 11, a detail of one of the slide-blocks mounted upon a pedal-lever and one of the pitmen.

The main rotating shaft or axle is in this instance composed of a tubular rod $a$ and a solid rod $a'$, of suitable diameter to slide freely into it, although it is obvious that I may employ a single rod or tubular shaft instead of a rod having a telescopic joint, the said joint being preferable to narrow the machine when desired—as, for instance, to convey the same through a narrow passage or to store it.

When employing a telescopic shaft, as shown, the interior of the tubular rod $a$ is reduced in diameter near its end, as at $a^2$ (see Fig. 3,) and again reduced in diameter at its extreme end, as at $a^3$, leaving tapering surfaces. The rod $a'$ is provided with a tapering end portion $a^4$ and a tapering portion $a^5$ to fit snugly the two tapering surfaces $a^2$ $a^3$ of the hollow rod $a$ when the solid rod $a'$ is drawn outward. The rod $a'$ is screw-threaded contiguous to the tapered portion $a^5$, and a check-nut $a^6$ is screwed thereon up to the end of the rod $a'$, and when turned tightly the tapering portions $a^3$ $a^4$ fit the interior of the rod $a$ snugly and form a rigid connection. Upon the ends of the rods $a$ $a'$ are mounted any usual or suitable drive-wheels A A', the said wheels turning freely on the ends of the shaft in one direction, but being restrained from backward rotation by pawl-and-ratchet connections consisting of a ratchet-wheel $b$, (see enlarged view, Fig. 4,) splined upon the rods $a$ $a'$. An annular hub $b'$, secured to the hub of each wheel, is provided at its interior with a series of spring-controlled pawls $b^2$, (see Fig. 4,) so located that one of the said pawls always engages some one tooth of the ratchet-wheel $b$. In this instance I have shown four such pawls located at unequal distances apart, the teeth of the ratchet-wheel $b$ being of such size that when one of the pawls is in engagement with one of the teeth of the wheel the remaining three pawls will lie at different distances from the engaging or abutting portions or ends of the teeth, so that should the drive-wheels commence to turn backward they can only turn one-fourth the distance of one tooth of the ratchet-wheel. The portion $a$ of the rotating shaft or axle has its bearings in a shell or case $c$, supported by arms or standards $c'$, rising from the main frame C, extending at right angles to the main rotating shaft or axle.

The shaft $a$ within the frame or case $c$ has secured to it a toothed gear $c'$, which is driven by the clutch mechanism now to be described. The clutch mechanism herein shown is composed, essentially, of a toothed gear $c^2$, chambered or cut away at its sides and mounted loosely upon the stud $c^3$, fixed in the side walls of the frame or case $c$, and of two ratchet-toothed disks $c^4$ $c^5$, mounted loosely upon the hubs of the gear $c^2$, the periphery of the said toothed disks lying in the chambers of the said gear, and of rollers or balls $c^6$, resting upon the teeth of the disks between their peripheries and the flanges of the gear $c^2$, and of crank-wheels $c^7$ $c^8$, the crank-wheel $c^7$ being fixed to the ratchet-toothed disk $c^4$, while the crank-wheel $c^8$ is fixed to the ratchet-toothed disk $c^5$, each crank-wheel having preferably a wrist-pin, as $c^{10}$, to receive the eye of a suitable pitman $c^{12}$, which is employed to reciprocate the crank-wheel from a suitable pedal-lever D or D'. As the crank-wheels and their attached toothed disks carrying the rolls or balls are rotated in one direction—as, for instance, in the direction of the arrow, Fig. 5—the rolls or balls are wedged between the disk and the flange of the toothed wheel $c^2$ and the latter is moved positively with the said disk; but when the disk is moved in the opposite direction the rolls or balls do not bite the gear $c^2$, but rather slip, so that it will be noticed that by operating the ratchet-toothed disks alternately in opposite directions they will alternately serve as the driver for the toothed gears $c^2$, keeping it in constant rotation, thus producing a motion of rotation from a motion of reciprocation.

The ratchet-toothed gear and balls form a well-known variety of clutching device; but instead of them I may employ without departing from this invention any other well-known equivalent clutching device for changing reciprocating into rotary motion.

As one of the chief aims of my invention is to drive continuously the main shaft or axle of a velocipede by means of pedals operated by the feet, the said pedals, through usual or suitable connecting devices, reciprocate in opposite directions two crank-wheels, the latter, by a clutching device between them and the gear-wheel, driving the latter continuously.

Although I have herein shown crank wheels or disks secured to the ratchet-toothed disks for rotating them, it is obvious that the wrist-pins may be attached directly to the ratchet-toothed disks, or any other form of crank may be employed, the crank-wheels being employed to serve as a plate to protect the ratchet-toothed disks and retain the rolls or balls in position. Each pitman $c^7$ is connected with one end of a lever-like dog $c^{13}$ by a screw $c^{14}$, each dog being pivoted upon a block $e'$, adapted to slide freely upon the pedal-levers D D', the end of each dog $c^{13}$ opposite that to which the pitman is connected engaging the top of the pedal-lever while the said lever is being depressed or being disengaged therefrom as the lever is lifted by the stiff spring $d'$ $d'$ normally acting to lift the pedal-levers. Each pedal-lever has at one side a sleeve-like hub $d^2$, which fits the conical edge of the stud $d^8$, the sleeve being retained upon the said stud by suitable nuts $d^9$. Each of the slide-blocks $e$ $e'$ is provided upon its inner side with two pins 2 2 or 3 3, which follow each side of curved ribs 4 5, located upon the opposite sides of a master-block $f$, mounted upon the frame C so as to be positively moved thereon. (See Fig. 10.) The ribs 4 5 are curved to conform to the arc of the circle prescribed by the pins of the slide-blocks $e$ $e'$ upon the pedal-levers as the said pedal-levers are depressed. The master-block $f$ is moved upon the frame C by a lever pivoted at $g'$ to an ear $g^2$, projecting from one side of the shell or case $c$, one end of the said lever being bifurcated to astride the master-block $f$ and engage pins 8 9, projecting therefrom, the said bifurcated ends of the rod being slotted to permit the pins 8 9 to freely move therein as the block $f$ is moved on the supporting-bar toward or from the pivoted point $d^2$ of the pedal-levers. The opposite end of the lever $g$ is provided with a hand-piece $g^4$, by which it is turned back and forth on its pivot to move the block $f$. A locking device consisting of a pivoted engaging-dog $h$, controlled by a spring $h'$ and engaging one of a series of teeth $h^2$ cut in the top of an overhanging arm $h^3$, bolted to the arm $n$, is employed to lock the said lever $g$ in any desired position. Thus it will be seen that the power required to depress the pedal-levers may be varied by simply moving the rod $g$ by hand. As the pedal-levers are depressed alternately, the pitmen $c^{12}$ are drawn downward from their normal positions alternately until they arrive near their lower dead-centers, when the pedal-levers are lifted and the pitmen returned alternately to their normal positions, thereby reciprocating the cranks and their attached ratchet-toothed disks alternately, but effecting the continuous rotation of the toothed gear $c^3$, as previously described. By the employment of the ratchet-and-pawl connection controlling the rotation of the drive-wheels, as described, the pedal-levers may remain in any position and the drive-wheels rotate forward independent of the rotating shaft or axle—as, for instance, in going down hill; but the said pawls restrain the wheels from backward rotation.

The steering device consists of a rod E, secured to a hub or socket $j$, mounted to turn freely upon the tapering shank $i$ of a bolt passing upward through the extreme ends of the frame or bar C, (see Fig. 7,) said bolt being held in position by a collar or flange $i'$ and a nut $i^2$. The hub or socket $j$ has secured to it a yoke $m$, which astrides the steering-wheel F, the ends of the arms of the said yoke $m$ serving as bearings for the axle of the steering-wheel. The steering-rod E is turned by a cross-bar H, having handles 12 14 to be grasped by the rider, the said rod being fast to the hub $j$, carrying the yoke $m$, so that when turned by the cross-bar the steering-wheel F will be moved. As the small steering-wheel F is very sensitive in its movements, a centering device is provided, it consisting of a strip or guide $i^4$, (see Fig. 8,) bent to form a compound curve and having an arm $i^6$, by which it is attached to a collar $i^5$, secured to the hub $j$. A roller $i^7$ is mounted loosely upon the end of a yielding arm $i^8$, rigidly secured to the frame or bar C, bearing upon the said curved strip $i^4$ and normally lying in the deepest portion thereof, at which time the steering-wheel is parallel with the drive-wheels. As the rod E is turned by the cross-bar H, the guide $i^4$ is carried or moved beneath the yielding roller $i^7$.

The brake consists of a brake-shoe $o$, fitted to a yoke $o'$, the arms of which are pivotally connected with a yoke $m$ near its junction with the hub $j$. The yoke $o'$ has an arm $o^2$ leading therefrom opposite its pivotal connection, the end of the said arm $o^2$ having a rod $o^3$ attached thereto, the said rod extending upward parallel with the steering-rod E, moving in suitable guide-eyes $o^4$, and attached at its upper end to the hand-lever $o^5$, pivoted to the cross-bar H, so that as the said lever is turned on its pivot the rod $o^3$ is lifted, causing the brake-shoe to come in contact with the periphery of the steering-wheel F. The rod $o^3$ is normally held in its lowermost position by a spring $o^6$. It will be seen that the yoke $o'$, carrying the brake-shoe, is pivoted eccentrically to the pivot of the steering-wheel, so that when the rod $o^3$ is lifted sufficiently to permit the brake-shoe to come in contact with the periphery of the steering-wheel the frictional contact thus obtained will assist in causing the brake-shoe to bear upon the periphery of the wheel. The seat $m$ is in this instance supported by a spring $l'$, mounted upon a standard $l^2$, adjustably connected to an arm $n$, leading from the case $c$; yet it is obvious that any other suitable form of seat may be employed.

The wheels I prefer to employ consist of a wooden hub $r$, spokes $r'$, and felly $r^2$. A steel tire $r^3$, having flanged edges $r^4$, is shrunk around the felly in any usual manner, and a rubber tire $r^5$ is placed within the flanged edges of the metal tire $r^4$, after which the said flanged edges are turned inward toward each other, thus binding or clamping the rubber tire firmly in position.

While I have shown the essential features of my invention as embodied in a tricycle, it is obvious that many of the features herein shown are also applicable to velocipedes of other well-known type. It is obvious that instead of the pawl-and-ratchet connection herein shown for permitting the drive-wheels to turn ahead of or independent of the main rotating shaft or axle any other suitable well-known clutch mechanism may be employed. It is also obvious that instead of employing two tapering portions, as $a^3$ $a^4$, to form a rigid connection with the telescopically-sliding axle I may employ a single tapering portion of any other suitable length. It will be seen that the steering-rod E is rearwardly inclined and that the yoke carrying the steering-wheel is rigidly connected therewith, so that as the said rod is turned by the rider the steering-wheel inclines from a vertical plane in one or the other direction, according to which way the steering-rod E is turned, thereby making a steering-wheel more sensitive to be controlled by the rider and by the employment of a centering device less sensitive to the action of a rough road.

I claim—

1. In a velocipede, the main shaft or axle and drive-wheels carried thereby, combined with intermeshing toothed gears for rotating the main shaft and reciprocating ratchet-toothed disks for imparting a continuous rotation to the gears, substantially as described.

2. In a velocipede, the main rotating shaft or axle and drive-wheels carried thereby, and a clutch mechanism, substantially as described, for rotating said main shaft, a pair of reciprocating cranks, pitmen, pedal-levers for operating the clutch mechanism, and slide-blocks upon the pedal-levers, to which the pitmen are connected, substantially as described.

3. In a velocipede, a main rotating shaft or axle and drive-wheels carried thereby, a pinion $c'$, mounted upon the main shaft or axle, and a flanged toothed gear $c^2$ for driving the said pinion $c'$, combined with a pair of reciprocating ratchet-toothed disks, a series of rollers for rotating the flanged toothed gear continuously, and a pair of cranks for operating the ratchet-toothed disks, substantially as described.

4. In a velocipede, the main rotating shaft or axle and drive-wheels carried thereby, and a clutch mechanism for rotating the main shaft or axle, combined with a pair of pedal-levers and slide-blocks mounted upon said pedal-levers, connected with the clutch mechanism, and a master-block mounted upon the frame to change the position of the slide-block, substantially as described.

5. In a velocipede, the main rotating shaft or axle and drive-wheels carried thereby, a clutch mechanism, substantially as described, for rotating the main shaft or axle, and a pair of reciprocating cranks, combined with a pair of pedal-levers and slide-blocks mounted upon said pedal-levers, to which the cranks are connected, a master-block mounted upon the frame to change the position of the slide-blocks, and means, substantially as described, for positively moving the master-block and locking the same in any desired position, substantially as described.

6. In a velocipede, the main rotating shaft or axle and drive-wheels carried thereby, and clutch mechanism, substantially as described, for rotating the main shaft or axle, combined with a pair of reciprocating cranks and pitmen, a pair of pedal-levers, slide-blocks mounted thereon, and pivoted gripping-levers carried by the slide-blocks to which the pitmen are connected, substantially as described.

7. In a velocipede, the main rotating shaft or axle and drive-wheels carried thereby, the clutch mechanism, substantially as described, for rotating the main shaft, the reciprocating cranks, pitmen, pedal-levers and slide-blocks mounted upon the pedal-levers, to which the pitmen are connected, and guide-pins projecting from the slide-blocks, combined with a master-block mounted on the frame or bar C and having curved ribs or guides upon each side, and a pivoted hand-rod connected with the movable block, by which the latter is moved back and forth upon the frame or bar, to thereby increase or diminish the power required to operate the pedal-levers, substantially as described.

8. In a velocipede, the main rotating shaft or axle, consisting of the tubular rod $a$, having its internal diameter reduced at or near its end, as described, and a rod $a'$, having the tapering portions, as described, and a check-nut $a^6$, all substantially as described.

In testimony whereof I have signed my name to this specification in the presence of two subscribing witnesses.

STERLING ELLIOTT.

Witnesses:
BERNICE J. NOYES,
F. L. EMERY.